United States Patent
Sung et al.

(10) Patent No.: US 9,710,875 B2
(45) Date of Patent: Jul. 18, 2017

(54) IMAGE TRANSMISSION APPARATUS AND IMAGE PROCESSING METHOD THEREOF

(71) Applicant: VIA TECHNOLOGIES, INC., New Taipei (TW)

(72) Inventors: Chien-Cheng Sung, New Taipei (TW); Ping-Huei Hsieh, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 347 days.

(21) Appl. No.: 14/159,169

(22) Filed: Jan. 20, 2014

(65) Prior Publication Data

US 2015/0042666 A1 Feb. 12, 2015

(30) Foreign Application Priority Data

Aug. 12, 2013 (TW) .............................. 102128802 A

(51) Int. Cl.
*G06T 1/20* (2006.01)
*G09G 5/00* (2006.01)
*G09G 5/36* (2006.01)

(52) U.S. Cl.
CPC ............... *G06T 1/20* (2013.01); *G09G 5/006* (2013.01); *G09G 5/363* (2013.01); *G09G 2370/042* (2013.01); *G09G 2370/047* (2013.01); *G09G 2370/14* (2013.01)

(58) Field of Classification Search
None
See application file for complete search history.

(56) References Cited

U.S. PATENT DOCUMENTS

| | | | |
|---|---|---|---|
| 8,745,366 B2 | 6/2014 | Wyatt et al. | |
| 8,760,459 B2 | 6/2014 | Hedges | |
| 2009/0278763 A1* | 11/2009 | Zeng | G06F 3/1431 345/1.1 |
| 2010/0253691 A1 | 10/2010 | Lin et al. | |
| 2011/0025696 A1* | 2/2011 | Wyatt | G09G 5/363 345/502 |
| 2012/0066425 A1* | 3/2012 | Zeng | G06F 13/00 710/303 |
| 2012/0257105 A1* | 10/2012 | Kimoto | H04N 21/4621 348/441 |
| 2014/0198089 A1* | 7/2014 | Lin | G09G 3/3611 345/212 |

FOREIGN PATENT DOCUMENTS

| | | |
|---|---|---|
| TW | 201011607 | 3/2010 |
| TW | 201037627 | 10/2010 |
| TW | 201207723 | 2/2012 |
| TW | 201303849 | 1/2013 |

* cited by examiner

*Primary Examiner* — Tize Ma
(74) *Attorney, Agent, or Firm* — McClure, Qualey & Rodack, LLP

(57) ABSTRACT

An image transmission apparatus for providing a low voltage differential signaling (LVDS) data stream to a display panel is provided. The image transmission apparatus includes a transmitter and a graphic processing unit (GPU). The transmitter obtains an extended display identification data (EDID) according to an inter integrated circuit signal from the display panel. The GPU provides configuration data according to the EDID, and provides a display port (DP) data stream according to an image data. The transmitter obtains a transfer parameter according to the configuration data, and converts the DP data stream into the LVDS data stream according to the transfer parameter.

16 Claims, 4 Drawing Sheets

IMAGE TRANSMISSION APPARATUS AND IMAGE PROCESSING METHOD THEREOF

CROSS REFERENCE TO RELATED APPLICATIONS

This Application claims priority of Taiwan Patent Application No. 102128802, filed on Aug. 12, 2013, the entirety of which is incorporated by reference herein.

BACKGROUND OF THE INVENTION

Field of the Invention

The invention relates to an image transmission apparatus, and more particularly to an image transmission apparatus for converting a display port (DP) standard into a low voltage differential signaling (LVDS) standard.

Description of the Related Art

Nowadays, electronic products have many requests for video and file data transmission, thereby progressing high-speed transmission interface technology. Low voltage differential signaling (LVDS) is a high-speed and low power consumption interface that is used by various notebook computer manufacturers, wherein the LVDS interface can provide a direct digital connection between a processor and a liquid crystal display (LCD) panel. The LVDS interface provides a very high transmission rate only with low power consumption, and little interference is induced. In addition, the LVDS technology is suitable for short-distance transmission lines.

Furthermore, the Video Electronics Standards Association (VESA) developed a display port (DP) standard in 2006, to replace the digital visual interface (DVI) standard and video graphics Array (VGA) standard. The DP interface provides high resolution and can support 16-bit color depth, thus the DP interface is widely used in notebook computers and display panels. Since the apparatus may be equipped with a different transmission interface, solutions are needed for various converters, such as the DP to DVI standard converter, the DP to LVDS standard converter.

FIG. 1 shows a conventional image system 100. The image system 100 comprises an image transmission apparatus 120 and a display panel 10, wherein an LVDS connection port 150 of the image transmission apparatus 120 is coupled to an LVDS connection port 20 of the display panel 10 via a LVDS transmission line 110. The image transmission apparatus 120 comprises a graphic processing unit (GPU) 130, a transmitter 140 and a read only memory (ROM) 160. When the image transmission apparatus 120 is coupled to the display panel 10, a firmware 145 of the transmitter 140 obtains an extended display identification data (EDID) information $S_{EDID}$ via the LVDS transmission line 110. According to the EDID information $S_{EDID}$, the firmware 145 of the transmitter 140 selects the configuration data $S_{CONF}$ corresponding to display characteristics of the display panel 10 from the ROM 160. Thus, according to the configuration data $S_{CONF}$, the transmitter 140 converts a DP data stream $S_{DP}$ from the GPU 130 into a LVDS data stream $S_{LVDS}$, and transmits the LVDS data stream $S_{LVDS}$ to the display panel 10 via the LVDS transmission line 110. In the image system 100, the ROM 160 will occupy the printed circuit board (PCB) area of the image transmission apparatus 120, thereby increasing the manufacturing cost.

BRIEF SUMMARY OF THE INVENTION

An image transmission apparatus and image processing methods thereof for providing a low voltage differential signaling (LVDS) data stream to a display panel are provided. An embodiment of an image transmission apparatus for providing a low voltage differential signaling (LVDS) data stream to a display panel is provided. The image transmission apparatus comprises: a transmitter, obtaining a first extended display identification data (EDID) according to an inter integrated circuit (I2C) signal from the display panel; and a graphic processing unit (GPU), providing configuration data according to the first EDID, and providing a display port (DP) data stream according to an image data. The transmitter obtains a transfer parameter according to the configuration data, and converts the DP data stream into the LVDS data stream according to the transfer parameter.

Furthermore, an embodiment of an image processing method for an image transmission apparatus is provided, wherein the image transmission apparatus comprises a graphic processing unit (GPU) and a transmitter, and the image transmission apparatus is coupled to a display panel via a low voltage differential signaling (LVDS) transmission line. An extended display identification data (EDID) from the display panel is obtained according to an inter integrated circuit (I2C) signal from the display panel. In response to the EDID, configuration data is provided to the transmitter by the GPU. A display port (DP) data stream corresponding to an image data from the GPU is converted into a LVDS data stream according to the configuration data by the transmitter. The LVDS data stream is transmitted to the display panel via the LVDS transmission line.

Furthermore, another embodiment of an image processing method for an image transmission apparatus is provided, wherein the image transmission apparatus comprises a graphic processing unit (GPU) and a transmitter, and the image transmission apparatus is coupled to a display panel via a low voltage differential signaling (LVDS) transmission line. An identification data from the display panel is obtained according to an inter integrated circuit (I2C) signal from the display panel. An extended display identification data (EDID) corresponding to the display panel is obtained from a plurality of EDID of a storage unit of the GPU according to the identification data, by the GPU. In response to the EDID, configuration data is provided to the transmitter by the GPU. A display port (DP) data stream corresponding to an image data from the GPU is converted into a LVDS data stream according to the configuration data by the transmitter. The LVDS data stream is transmitted to the display panel via the LVDS transmission line.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
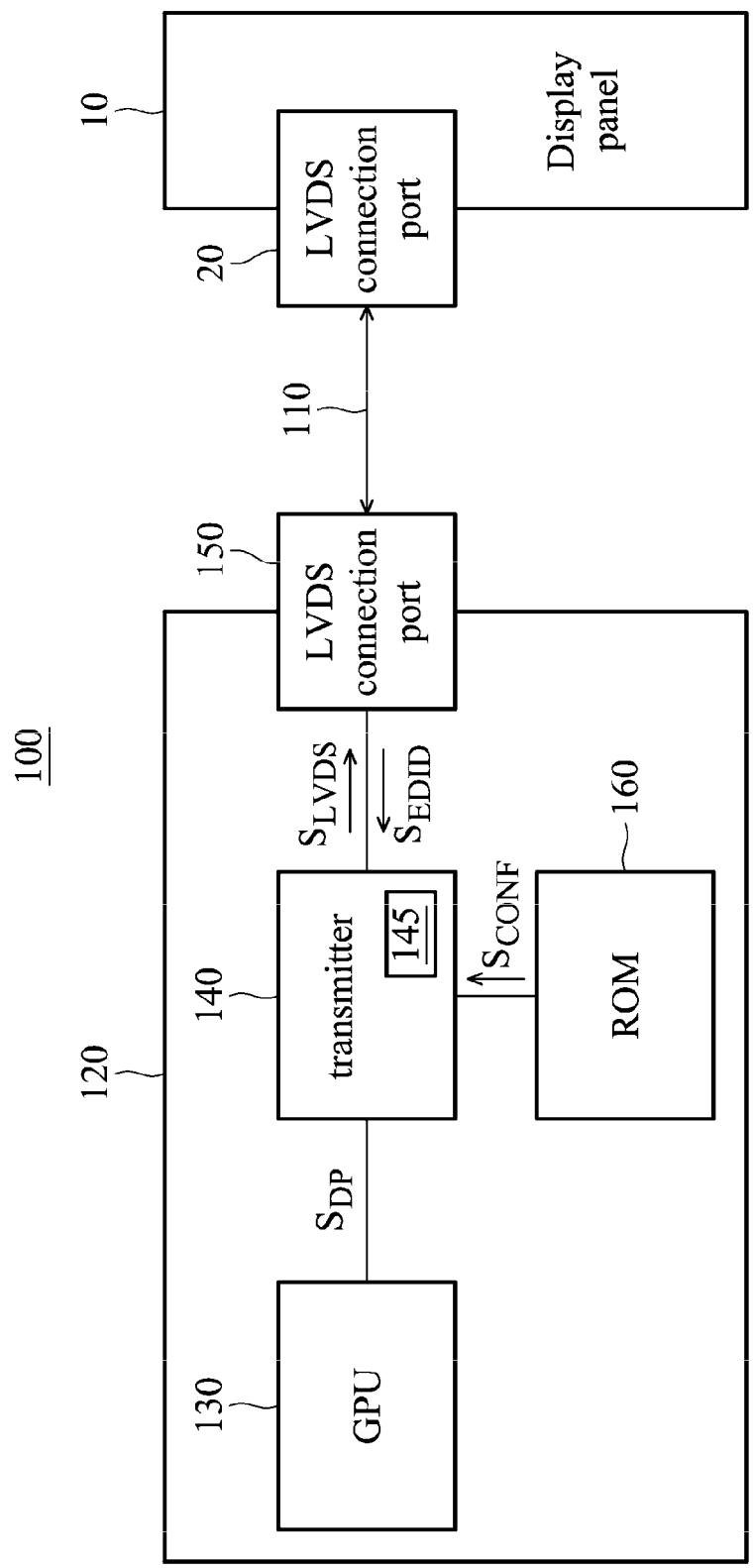
FIG. 1 shows a conventional image system.
Figure 2:
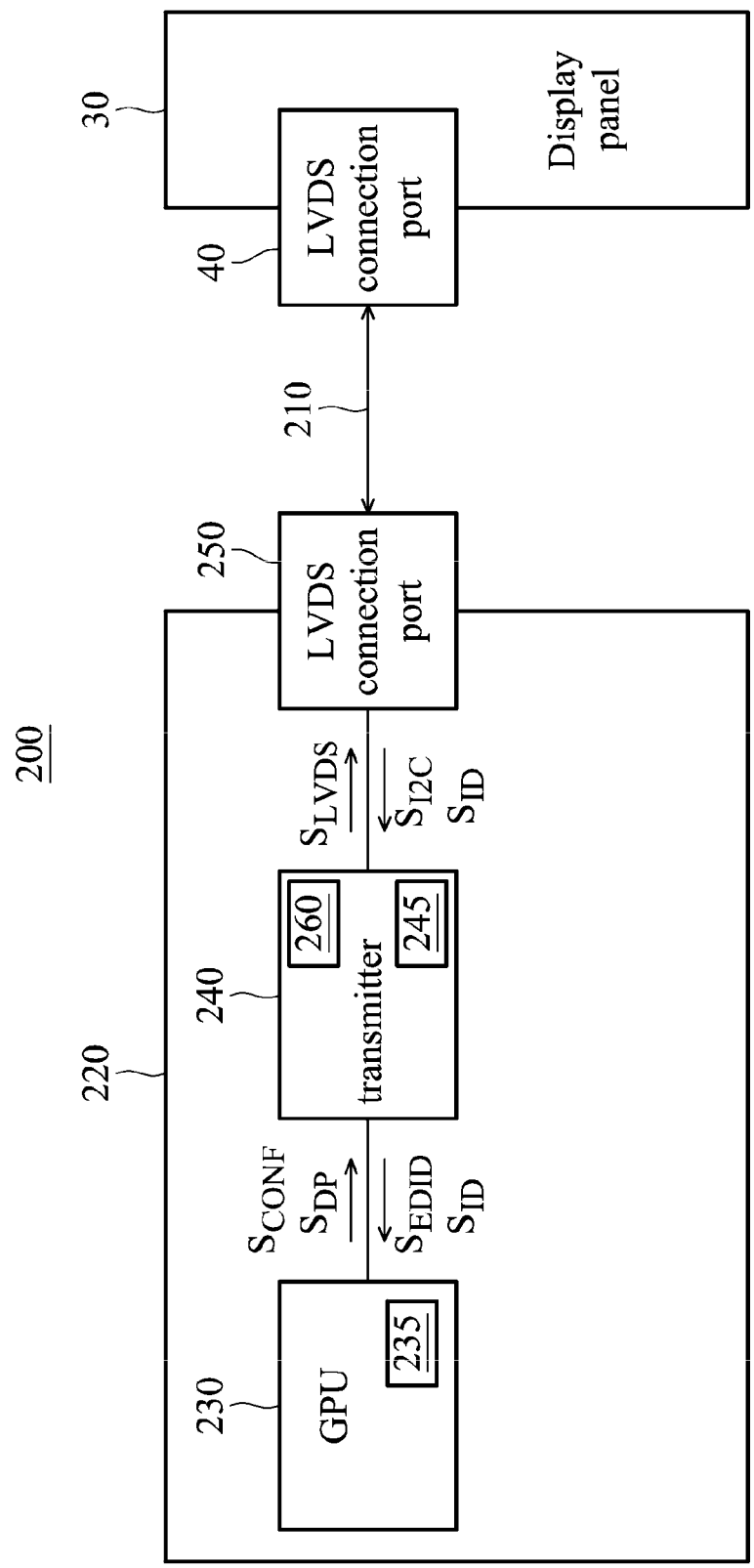
FIG. 2 shows an image system according to an embodiment of the invention.

FIG. 2 shows an image system 200 according to an embodiment of the invention. The image system 200 comprises an image transmission apparatus 220 and a display panel 30, wherein a low voltage differential signaling (LVDS) connection port 250 of the image transmitting apparatus 220 is coupled to a LVDS connection port 40 of the display panel 30 via a LVDS transmission line 210. Compared with a conventional image transmitting apparatus (e.g. the image transmitting apparatus 120 of FIG. 1), the image transmitting apparatus 220 comprises a graphic processing unit (GPU) 230 and a transmitter 240. When the image transmitting apparatus 220 is coupled to the display panel 30, a firmware 245 of the transmitter 240 obtains an Inter-Integrated Circuit (I²C) signal $S_{I2C}$ from the display panel 30 via the LVDS transmission line 210. According to the I²C signal $S_{I2C}$, the transmitter 240 obtains an extended display identification data (EDID) information $S_{EDID}$. The EDID information $S_{EDID}$ comprises related information of a screen resolution of the display panel 30, such as manufacturer name, serial number, display parameters, clock information, and so on. Next, the firmware 245 of the transmitter 240 transmits the EDID information $S_{EDID}$ to the GPU 230. In the embodiment, the transmitter 240 and the GPU 230 communicate with each other via a transmission line of a display port (DP) standard, such as an AUX audio transmission line. Furthermore, in another embodiment, the transmitter 240 and the GPU 230 communicate with each other via an embedded Display Port (eDP) technology (e.g. a bus), thereby configurations of transmission lines are decreased. According to the received EDID information $S_{EDID}$, the GPU 230 provides the configuration data $S_{CONF}$ corresponding to display characteristics of the display panel 30 to the transmitter 240. Thus, according to the configuration data $S_{CONF}$, the transmitter 240 obtains a transfer parameter (e.g. a resolution, clock information and so on) and stores the transfer parameter into a plurality of registers of a storage unit 260. Next, according to the transfer parameter, the transmitter 240 converts a DP data stream $S_{DP}$ from the GPU 230 into a LVDS data stream $S_{LVDS}$, and transmits the LVDS data stream $S_{LVDS}$ to the display panel 30 via the LVDS transmission line 210, wherein the GPU 230 provides the DP data stream $S_{DP}$ according to an image data. In the image transmitting apparatus 220, no additional read only memory (e.g. the ROM 160 of FIG. 1) is used to store various types of configuration data $S_{CONF}$ of the display panels. Therefore, manufacture cost and access time of ROM accessed by the transmitter 240 are decreased, thereby speeding up the configuration settings for the display panel 30. Moreover, a plurality of configuration settings $S_{CONF}$ corresponding to various types of display panels are stored in the memory or the registers of the GPU 230, which can be programmed by the firmware or software, thus the configuration settings $S_{CONF}$ are extensible.

Furthermore, some types of display panels do not provide any EDID information $S_{EDID}$. Therefore, in FIG. 2, the GPU 230 further comprises a storage unit 235, wherein the storage unit 235 is used to store the EDID information $S_{EDID}$ of various types of display panels. When the image transmitting apparatus 220 is coupled to the display panel 30, the firmware 245 of the transmitter 240 obtains identification data $S_{ID}$ from the display panel 30 via the LVDS transmission line 210. The identification data $S_{ID}$ comprises the related information of the display panel 30, such as a manufacturer name, a serial number and so on. Next, the firmware 245 of the transmitter 240 transmits the identification data $S_{ID}$ to the GPU 230. According to the received identification data $S_{ID}$, the GPU 230 obtains the EDID information $S_{EDID}$ corresponding to the display panel 30 from the storage unit 235. Next, according to the EDID information $S_{EDID}$ from the storage unit 235, the GPU 230 provides the configuration data $S_{CONF}$ corresponding to the display characteristics of the display panel 30 to the transmitter 240. Thus, the transmitter 240 obtains the transfer parameter (e.g. the resolution, clock information etc.) according to the configuration data $S_{CONF}$, so as to convert the DP data stream $S_{DP}$ from the GPU 230 into the LVDS data stream $S_{LVDS}$, and transmits the LVDS data stream $S_{LVDS}$ to the display panel 30 via the LVDS transmission line 210.

Figure 3:
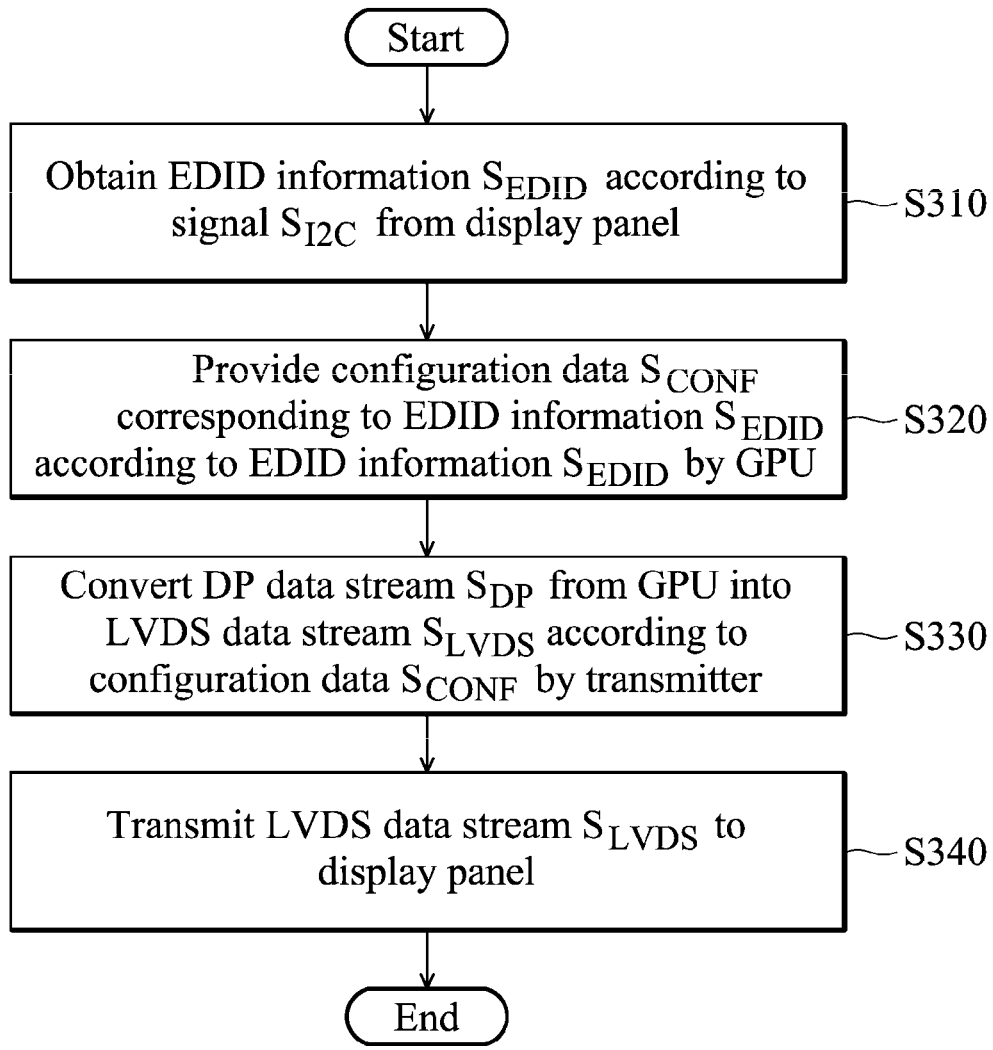
FIG. 3 shows an image processing method for the image transmitting apparatus of FIG. 2 according to an embodiment of the invention.

FIG. 3 shows an image processing method for the image transmitting apparatus 220 of FIG. 2 according to an embodiment of the invention. Referring to FIG. 2 and FIG. 3 together, first, in step S310, the transmitter 240 obtains the EDID information $S_{EDID}$ according to the I²C signal $S_{I2C}$ from the display panel 30, and the transmitter 240 transmits the EDID information $S_{EDID}$ to the GPU 230. Next, in step S320, the GPU 230 provides the configuration data $S_{CONF}$ corresponding to the EDID information $S_{EDID}$ to the transmitter 240 according to the received EDID information $S_{EDID}$. Next, in step S330, the transmitter 240 obtains the transfer parameter (e.g. the resolution, clock information and so on) according to the configuration data $S_{CONF}$, so as to convert the DP data stream $S_{DP}$ from the GPU 230 into the LVDS data stream $S_{LVDS}$. Next, in step S340, the transmitter 240 transmits the LVDS data stream $S_{LVDS}$ to the display panel 30 via the LVDS transmission line 210.

Figure 4:
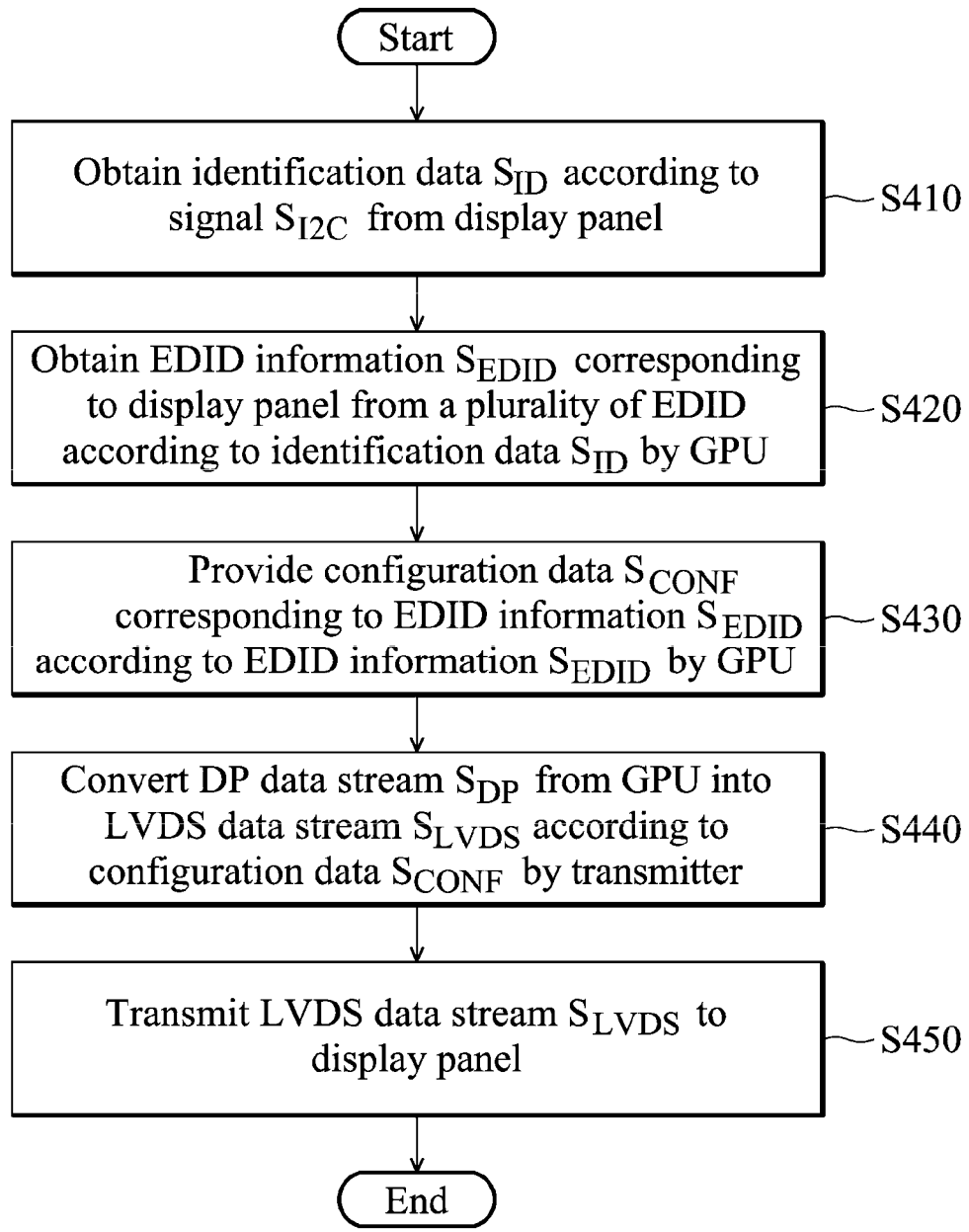
FIG. 4 shows an image processing method for the image transmitting apparatus of FIG. 2 according to another embodiment of the invention.

FIG. 4 shows an image processing method for the image transmitting apparatus 220 of FIG. 2 according to another embodiment of the invention. Referring to FIG. 2 and FIG. 4 together, first, in step S410, the transmitter 240 obtains the identification data $S_{ID}$ according to the I²C signal $S_{I2C}$ from the display panel 30, and the transmitter 240 transmits the identification data $S_{ID}$ to the GPU 230. Next, in step S420, the GPU 230 obtains the EDID information $S_{EDID}$ corresponding to the display panel 30 from the plurality of EDID stored in the storage unit 235 according to the identification data $S_{ID}$. In step S430, the GPU 230 provides the configuration data $S_{CONF}$ corresponding to the EDID information $S_{EDID}$ to the transmitter 240 according to the EDID information $S_{EDID}$. Next, in step S440, the transmitter 240 obtains the transfer parameter (e.g. the resolution, clock information and so on) according to the configuration data $S_{CONF}$, so as to convert the DP data stream $S_{DP}$ from the GPU 230 into the LVDS data stream $S_{LVDS}$. Next, in step S450, the transmitter 240 transmits the LVDS data stream $S_{LVDS}$ to the display panel 30 via the LVDS transmission line 210.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image transmission apparatus for providing a low voltage differential signaling (LVDS) data stream to a display panel, comprising:

an LVDS connection port coupled to the display panel;
a transmitter coupled to the LVDS connection port, obtaining a first extended display identification data (EDID) according to an inter integrated circuit (I2C) signal from the display panel via the LVDS connection port; and
a graphic processing unit (GPU) coupled to the transmitter via a transmission line of a display port (DP) standard, providing configuration data according to the first EDID from the transmitter via the transmission line, and providing a DP data stream to the transmitter via the transmission line according to an image data,
wherein the transmitter obtains a transfer parameter according to the configuration data, and converts the DP data stream into the LVDS data stream according to the transfer parameter,
wherein the transmitter provides the LVDS data stream to the display panel via the LVDS connection port,
wherein the GPU comprises:
a storage unit, storing a plurality of EDID,
wherein when the GPU obtains an identification data from the display panel via the transmitter, the GPU obtains a second EDID corresponding to the display panel from the plurality of EDID of the storage unit according to the identification data, and provides the configuration data according to the second EDID.

2. The image transmission apparatus as claimed in claim 1, wherein the transmitter is coupled to the display panel via the LVDS connection port and a LVDS transmission line.

3. The image transmission apparatus as claimed in claim 2, wherein the transmission line is an audio transmission line or a bus.

4. The image transmission apparatus as claimed in claim 1, wherein the transfer parameter comprises a resolution of the display panel.

5. The image transmission apparatus as claimed in claim 1, wherein the transmitter comprises a plurality of registers for storing the transfer parameter.

6. An image processing method for an image transmission apparatus, wherein the image transmission apparatus comprises a graphic processing unit (GPU), a low voltage differential signaling (LVDS) connection port and a transmitter coupled between the GPU and the LVDS connection port, and the LVDS connection port of the image transmission apparatus is coupled to a display panel via an LVDS transmission line, comprising:
obtaining an extended display identification data (EDID) from the display panel according to an inter integrated circuit (I2C) signal from the display panel via the LVDS connection port, by the transmitter;
in response to the EDID, providing configuration data to the transmitter via a transmission line of a display port (DP) standard by the GPU;
converting a DP data stream corresponding to an image data from the GPU into a LVDS data stream according to the configuration data, by the transmitter; and
transmitting the LVDS data stream to the display panel via the LVDS connection port and the LVDS transmission line, by the transmitter,
wherein the step of converting the DP data stream corresponding to the image data from the GPU into the LVDS data stream according to the configuration data, by the transmitter further comprises:

obtaining a transfer parameter according to the configuration data; and
converting the DP data stream into the LVDS data stream according to the transfer parameter.

7. The image processing method as claimed in claim 6, wherein the transmitter obtains the EDID via the LVDS connection port and the LVDS transmission line.

8. The image processing method as claimed in claim 7, wherein the transmission line is an audio transmission line or a bus.

9. The image processing method as claimed in claim 6, wherein the transmitter comprises a plurality of registers for storing the transfer parameter.

10. The image processing method as claimed in claim 9, wherein the transfer parameter comprises a resolution of the display panel.

11. An image processing method for an image transmission apparatus, wherein the image transmission apparatus comprises a graphic processing unit (GPU), a low voltage differential signaling (LVDS) connection port and a transmitter, and the LVDS connection port of the image transmission apparatus is coupled to a display panel via an LVDS transmission line, comprising:
obtaining an identification data from the display panel according to an inter integrated circuit (I2C) signal from the display panel via the LVDS connection port, by the transmitter;
obtaining an extended display identification data (EDID) corresponding to the display panel from a plurality of EDID of a storage unit of the GPU according to the identification data, by the GPU;
in response to the EDID, providing configuration data to the transmitter via a transmission line of a display port (DP) standard by the GPU;
converting a DP data stream corresponding to an image data from the GPU into a LVDS data stream according to the configuration data, by the transmitter; and
transmitting the LVDS data stream to the display panel via the LVDS connection port and the LVDS transmission line, by the transmitter.

12. The image processing method as claimed in claim 11, wherein the transmitter obtains the EDID via the LVDS connection port and the LVDS transmission line.

13. The image processing method as claimed in claim 12, wherein the transmission line is an audio transmission line or a bus.

14. The image processing method as claimed in claim 11, wherein the step of converting the DP data stream corresponding to the image data from the GPU into the LVDS data stream according to the configuration data, by the transmitter further comprises:
obtaining a transfer parameter according to the configuration data; and
converting the DP data stream into the LVDS data stream according to the transfer parameter.

15. The image processing method as claimed in claim 14, wherein the transmitter comprises a plurality of registers for storing the transfer parameter.

16. The image processing method as claimed in claim 15, wherein the transfer parameter comprises a resolution of the display panel.

* * * * *